(12) United States Patent
Österling et al.

(10) Patent No.: US 9,113,430 B2
(45) Date of Patent: Aug. 18, 2015

(54) BASE STATION AND METHOD FOR SCHEDULER CONTROLLED SETTING OF THE OUTPUT POWER OF A BASE STATION POWER AMPLIFIER

(75) Inventors: Jacob Österling, Järfälla (SE); Vimar Björk, Göteborg (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 880 days.

(21) Appl. No.: 13/254,006

(22) PCT Filed: Mar. 3, 2009

(86) PCT No.: PCT/SE2009/050227
§ 371 (c)(1),
(2), (4) Date: Aug. 31, 2011

(87) PCT Pub. No.: WO2010/101497
PCT Pub. Date: Sep. 10, 2010

(65) Prior Publication Data
US 2011/0317606 A1    Dec. 29, 2011

(51) Int. Cl.
*H04W 52/04* (2009.01)
*H04W 52/52* (2009.01)
*H04W 72/04* (2009.01)

(52) U.S. Cl.
CPC ...................................... *H04W 52/52* (2013.01)

(58) Field of Classification Search
None
See application file for complete search history.

(56) References Cited

U.S. PATENT DOCUMENTS

| | | | |
|---|---|---|---|
| 2002/0021683 A1* | 2/2002 | Holtzman et al. | 370/335 |
| 2006/0203713 A1* | 9/2006 | Laroia et al. | 370/209 |
| 2007/0110177 A1 | 5/2007 | Molander et al. | |
| 2007/0116142 A1 | 5/2007 | Molander | |
| 2008/0182530 A1 | 7/2008 | Mueller et al. | |
| 2008/0207143 A1 | 8/2008 | Skarby et al. | |
| 2009/0052327 A1 | 2/2009 | Larsson et al. | |
| 2010/0219887 A1* | 9/2010 | Ichitsubo et al. | 330/124 R |

FOREIGN PATENT DOCUMENTS

WO    2008007428 A1    1/2008

OTHER PUBLICATIONS

Seem, C. "Programming Output Power on CC243x." Design Note DN020, Texas Instruments, 2007.
Decision to Grant a Patent for Japanese Patent Application No. 2011-552905 mailed Feb. 25, 2013.

* cited by examiner

*Primary Examiner* — Ayaz Sheikh
*Assistant Examiner* — Sori Aga
(74) *Attorney, Agent, or Firm* — Coats & Bennett, PLLC

(57) ABSTRACT

The invention discloses a base station (110, 300) for a cell (105) in a cellular communications system (100). The base station comprises a scheduler (310) for scheduling transmissions to users (115, 120) in the cell (105) and a transmitter with a power amplifier (325). The scheduler (310) is also arranged to set the output power level of the power amplifier (325) for an upcoming transmission period.

22 Claims, 4 Drawing Sheets

BASE STATION AND METHOD FOR SCHEDULER CONTROLLED SETTING OF THE OUTPUT POWER OF A BASE STATION POWER AMPLIFIER

TECHNICAL FIELD

The present invention discloses a method and device for saving power in a base station in a cellular communications system.

BACKGROUND

In cellular communication systems, there is a constant and growing desire to reduce the power consumption of the so called Radio Access Network, the RAN, i.e. those parts of the system which do not include the user terminals.

A large part of the power consumption in a RAN lies in the controlling nodes of the cells in the systems, nodes which are referred to by different names in systems of different standards, but which are sometimes referred to generically as Radio Base Stations, RBS, or merely as base stations. In WCDMA systems, for example, RBSs are referred to as NodeB, and in LTE systems, RBSs are referred to as eNodeB.

However, regardless of the name and the system, a primary function of an RBS is that all traffic to and from users in a cell is routed via the RBS, which at least in part accounts for the large amounts of energy consumed by an RBS.

In LTE and WCDMA systems, the RBS also has the function of scheduling transmissions to and from the user terminals in a cell, a function which is usually performed by a so called MAC, Media Access Control, scheduler in the RBS.

Of the components in an RBS, a major power consumer is the so called Power Amplifier, the PA. Current demands for high peak data rates at the borders of the cells require the PAs in the base stations to have a high output power capability. A drawback of this is that the PA in most RBSs is overdimensioned for most normal operating scenarios, the drawback being that an overdimensioned PA consumes more energy than necessary.

A PA will have a peak output power as well as an average output power, with the difference between the two being known as the Peak-Average-Power Ratio, the PAPR. The PAPR of the PA ties into another important parameter of the transmissions from the base station, the so called Error Vector Magnitude, the EVM: in order for the transmissions from the base station to have a low EVM, the PA must be "backed off" (i.e. to reduce the output power from the peak output power) so that the sum of the average output power and the PAPR remains within the so called linear part of the PA. However, a high degree of "backing off" causes a high loss of efficiency in the PA, resulting in unnecessary energy consumption.

SUMMARY

As explained above, there is a need for a solution by means of which the power consumption of a PA in an RBS can be reduced during normal operation, and by which the PA output power capabilities are used optimally based on the actual traffic situation in the cell which is controlled by the RBS.

Such a solution is offered by the present invention in that it discloses an RBS for a cell in a cellular communications system which comprises a scheduler for scheduling transmissions to users in the cell and a transmitter with a power amplifier.

In the RBS of the invention, the scheduler is also arranged to set the output power level of the power amplifier for an upcoming transmission period.

Due to the fact that the scheduler in the RBS of the invention is arranged to set the output power level of the power amplifier for an upcoming transmission period, a higher degree of coordination can be obtained than before between the scheduling and the output power level of the PA, which enables an increased degree of power efficiency as compared to previous solutions, and which, as will be seen in the following, will also lead to an improvement in the EVM without unnecessary power expenditure.

In one embodiment, the base station additionally comprises a control unit for the power amplifier, and the scheduler is arranged to inform the control unit of the output power level which the power amplifier should have during said upcoming transmission period. The control unit is arranged to set the output power level in the power amplifier accordingly.

In one embodiment, the scheduler is also arranged to carry out the scheduling for the upcoming transmission period so as to minimize the output power level of the power amplifier and the level of a predefined error parameter in the power amplifier, and to set the output power level in the power amplifier accordingly.

In one embodiment of the invention, the predefined error parameter in the power amplifier is the Error Vector Magnitude, the EVM.

In one embodiment of the invention, the scheduler carries out the minimization by means of scheduling transmissions so as to create a first set of sub-units in the upcoming transmission period which are free of payload traffic and which thus are empty or only comprise reference symbols, whilst arranging a second set of sub-units of the upcoming transmission period which contain the payload traffic for the upcoming transmission period.

In one embodiment of the invention, the scheduler or the control unit for the power amplifier identifies the lowest order modulation with which the second set of sub-units can be transmitted, and uses this order modulation for the transmission of the second set of sub-units.

These and other embodiments will be described in more detail in the following description.

The invention also discloses a corresponding method for use in a base station.

BRIEF DESCRIPTION OF THE DRAWINGS

The invention will be described in more detail in the following, with reference to the appended drawings, in which.

DETAILED DESCRIPTION

In order to facilitate the understanding of the invention, some background information will be given with reference to FIGS. 1 and 2 before the invention is described in more detail.

Figure 1:
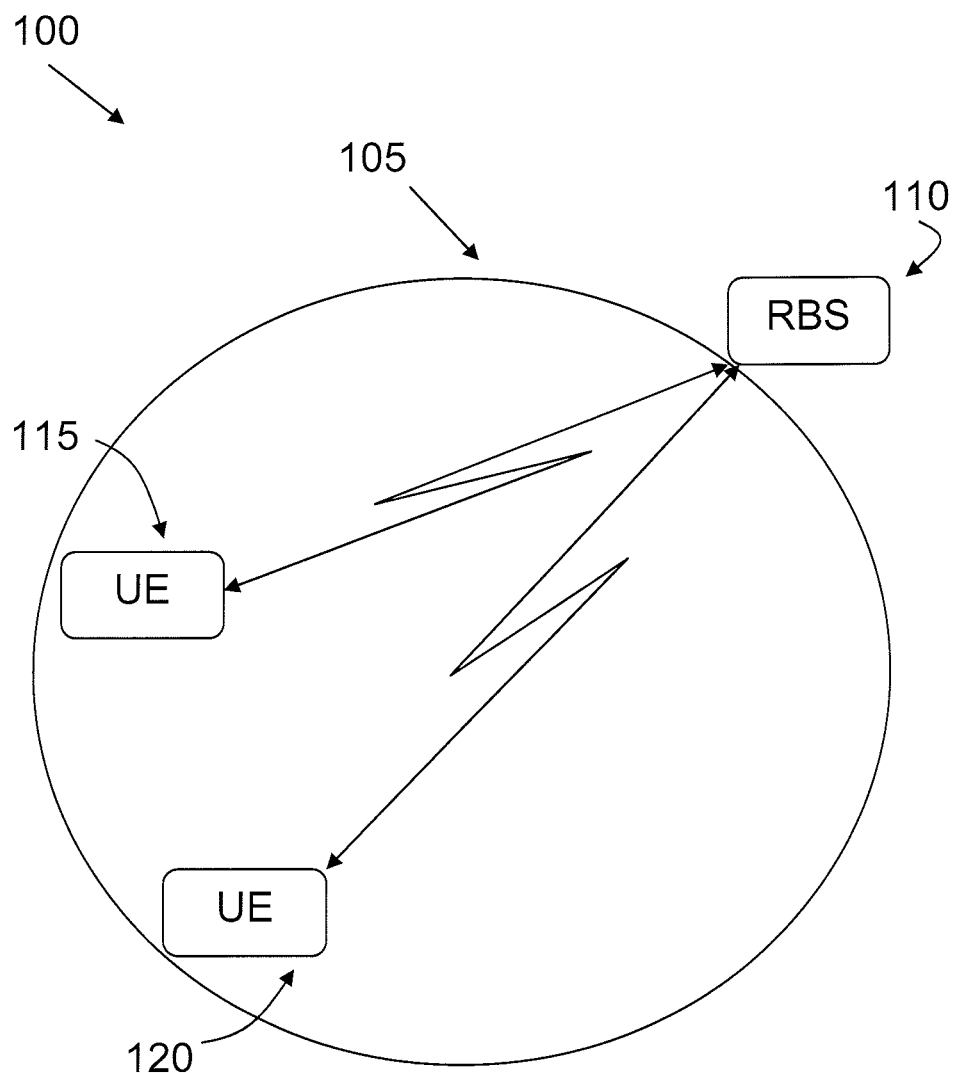
FIG. 1 shows a schematic overview of a system in which the invention can be applied.

FIG. 1 shows an example of a system 100 in which the present invention is suitably applied. As shown, the system 100 is a cellular system and comprises a number of cells, one of which is shown as 105 in FIG. 1. Each cell can comprise a number of user terminals, two of which are shown as 115 and 120 in FIG. 1, with the generic name "UE", User Equipment.

For each cell in the system 100, there is a controlling node, generically referred to as a "radio base station", RBS, which is shown as 110 in FIG. 1. One role of the base station 110 is that all traffic to and from the UEs in the cell 105 is routed via the RBS.

It should be noted that the controlling node, which is here referred to by the generic name "RBS" has different names in different kinds of systems, but the basic role of the RBS is the same. However, as examples, in systems of the WCDMA kind, the RBS is referred to as NodeB, and in LTE systems the RBS is referred to as the eNodeB. The present invention is applicable both to WCDMA systems and to LTE systems as well as to other systems, but this description will mainly use generic terms such as "RBS" and "UE".

Since all traffic to and from the UEs in a cell is routed via the RBS, the RBS will be a major consumer of energy in the system 100. As stated above, one purpose of the present invention is to achieve a reduction in the energy consumed by an RBS. To this end, the invention discloses a way of reducing the power consumed by the power amplifier, the PA, in an RBS, since the power amplifier is a major consumer of energy within an RBS.

Figure 2:
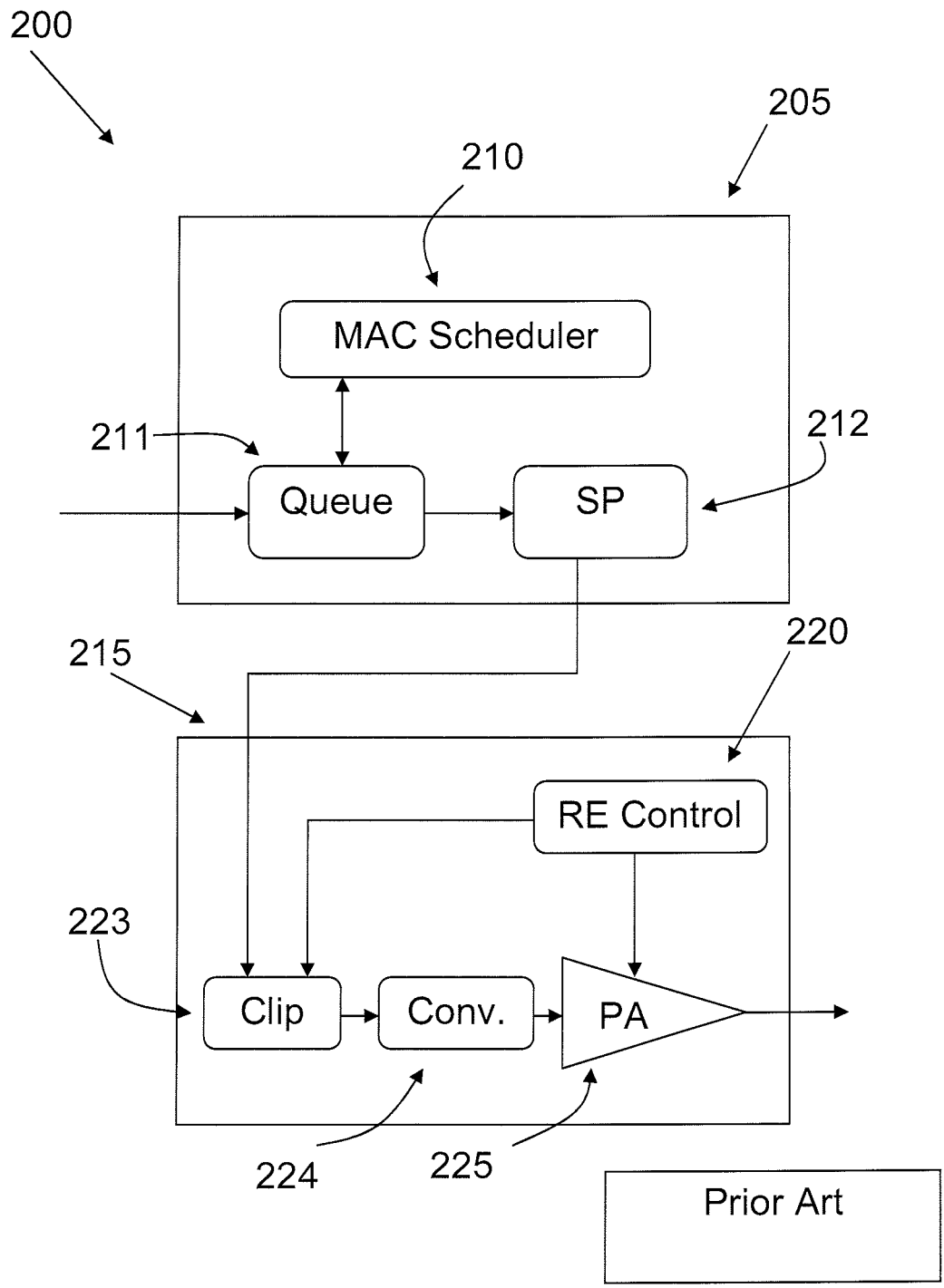
FIG. 2 shows a block diagram of a prior art base station of the invention.

In order to facilitate the understanding of the invention, FIG. 2 shows an example of relevant parts of a prior art RBS 200.

The parts shown of the RBS 200 are the so called REC, Radio Equipment Controller, 205, and the Radio Equipment, 215. The REC 205 comprises a so called MAC (Media Access Control) scheduler 210 which schedules transmissions to the UEs in a cell from the RBS 200. The REC 205 also comprises a queue 211 for outgoing data and a signal processing function, SP, 212.

The RE 215 comprises an RE control function 220, a Power Amplifier, PA 225, an up-converter, "Conv." 224, and as well as a clipping function, "Clip" 223, for so called clipping of the output from the PA 225, i.e. for removing the highest peaks of the output power from the PA 225.

Figure 3:
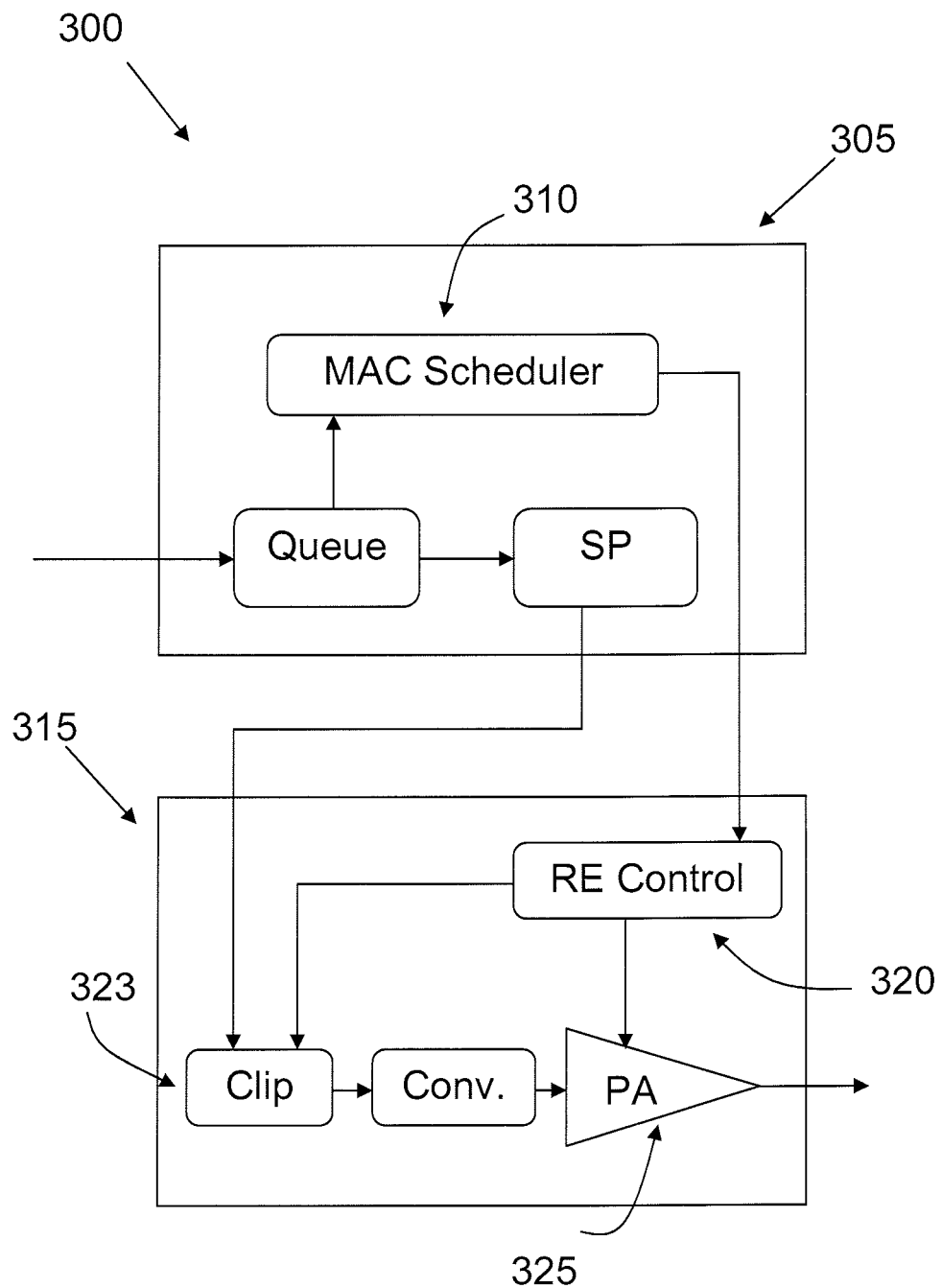
FIG. 3 shows a block diagram of a base station of the invention.

An RBS 300 of the invention is shown in FIG. 3. Although different reference numbers are used for the RBS 300 in FIG. 3, it will be realized that the basic "blocks" of the RBS 300 correspond to those of the prior art RBS 200. For example, the RBS 300 comprises an REC 305 and an RE 315.

However, one principle of the present invention is that the MAC scheduler 310 not only performs the scheduling of transmissions to the UEs in a cell, but that it is also arranged to set the output power level of the PA 325 for an upcoming transmission period. In addition to this, in one embodiment, the MAC scheduler 310 in an RBS 300 of the invention is arranged to carry out its scheduling for an upcoming transmission period so as to minimize the output power level of the power amplifier and the level of a predefined error parameter in the power amplifier, the PA 325. Suitably, the predefined error parameter is the EVM, the Error Vector Parameter.

The invention is beneficial with regards to the power consumption of the PA 325 in a number of ways and for a number of reasons, as exemplified by the following:

Sub-units of the upcoming transmission period which is scheduled by the MAC 310 can be freed from payload traffic, so that only reference symbols need to be transmitted in those sub-units. These sub-units will have a very low EVM requirement and a correspondingly low output power need, so that the PA 325 can operate on a very low performance level during such sub-units. Alternatively, the sub-units can be freed from all traffic so that they contain no signal to transmit, i.e. no reference symbols either, in which case the PA can be turned off for the duration of the sub-unit.

Those sub-units of the upcoming transmission period which contain payload traffic can use as low order modulation as possible, in order to reduce the EVM requirements. The PA "back-off" can be reduced for these sub-units, so that the PA efficiency will increase.

The MAC 310 scheduler of the RBS 300 of the invention can also enable signalling to the PA 325 of the output power used per symbol within a sub-unit, to allow "micro-sleep" of the PA 325 during unused symbols.

The invention is applicable both in LTE systems and in WCDMA systems. The upcoming transmission period referred to above, for which the scheduler predicts and analyses the traffic situation, would in the LTE case be one or more so called Sub Frames, SFs, and in the WCDMA case it would be one or more so called Frames. The sub-units referred to above would then in the LTE case at least one Sub Frame, one SF, and in WCDMA applications the sub-units would be TTIs, Transmission Time Intervals. The MAC scheduler executes its scheduling decision every sub frame (LTE) or TTI (WCDMA), within the strategy derived on frame basis. The upcoming transmission period which is scheduled by the MAC scheduler 210 is thus in LTE applications one or more sub frames and in WCDMA applications one or more TTIs.

As shown in FIG. 3, in one embodiment there is comprised in the RBS 300 a control unit 320 for the PA 325, and in one embodiment of the base station 300 of the invention, the MAC scheduler 310 informs the control unit 320 of the output power level of the power amplifier and of the level of a predefined error parameter in the power amplifier for the upcoming transmission period, and the control unit 320 sets the PA 325 accordingly. The signal sent from MAC scheduler 310 to the control unit 320 for the control of the PA 325 can comprise a set of values which are valid for the complete upcoming transmission period, or it may state a more fine-grained resolution, such as the output power level and the level of a predefined error parameter, such as the EVM, per OFDM symbol within the upcoming transmission period.

Thus, signals from the MAC scheduler 310 of the RBS 300 of the invention to the REC 320 or to the PA 325 will suitably be sent over an interface between the REC 305 and the RE 315.

In one embodiment, the control unit 320 informs the MAC scheduler 310 of the maximum output power that the PA 325 can handle. This can be used by the MAC scheduler 310 in order to, for example, group transmissions to users with low demands on EVM into one or more SFs, and to increase the average output power of the PA 325 during such SFs.

In general, in the following, various other embodiments of the invention will be described. Although LTE terminology will be used in the description of these embodiments, but it should be pointed out that this is merely in order to facilitate the reader's understanding of the invention; the invention may also be applied in WCDMA systems, with LTE specific details below being replaced with corresponding details in the WCDMA system, e.g. with TTIs of WCDMA corresponding to Sub Frames in LTE.

In one embodiment of the invention, as touched upon above, the MAC 310 monitors the load in the cell, and determines the number of SFs that need to be "active", with SFs that are not "inactive" only transmitting reference symbols. In other words, an "active" SF is an SF that carries payload traffic, as opposed to "inactive" SFs, i.e. SFs that carry only reference symbols. The MAC 310 transmits this information to the RE Control 320, by identifying upcoming SFs as belonging to one of the two categories "active" or "inactive".

For instance, if the load in the cell is below 30% as an average over the last few seconds, only 3 SFs of every 10 ms frame need to be transmitted, i.e. only 3 SFs out of 10 need to be "active", with the remaining 7 SFs out of 10 being "inactive", i.e. only transmitting reference symbols. The load in the cell is in this embodiment continuously monitored by the MAC 310, and when one or more transmission buffers in the RBS exceed a certain threshold, additional SFs are transferred from the "inactive" status to the "active" status. As an alternative to continuously monitoring the load in the cell, the load monitoring can of course be done at certain intervals or with a certain regularity.

Preferably, the SFs chosen by the MAC 310 to be active are the same as those SFs which should carry mandatory signalling, such as, for example, synchronization channels and broadcast information.

In another embodiment, in order to further optimize the power consumption of the SFs which carry traffic, the UEs can be sorted in categories based on their required modulation: High bit rate UEs which need or, are assured of, good link quality will benefit from higher order modulation and are selected by the MAC 310 to receive transmissions from the RBS in the same SFs. Low bit rate users and users with bad link quality will be selected for lower order modulation, with less requirements on EVM. These UEs are grouped together and receive transmissions from the RBS 300 together, i.e. in the same SFs.

Those SFs which can be utilized for transmissions to one or more users which can use low order modulation can have a lower back-off of the PA 325 and will thus cause a lower power consumption of the RE 315 and thereby also of the RBS 300.

The MAC scheduler 310 informs the RE Control 320 of the required output power and EVM for the next sub frame and the RE Control 220 then configures the PA 325 to act accordingly, e.g. by setting its bias and clipping thresholds accordingly.

In one version of this embodiment, a "joint link adaptation" is performed by the MAC 310 over the different UEs in the cell. The MAC 310 in this embodiment operates according to a quality indicator which the different UEs are assured of in their transmissions from the RBS 300, such as, for example, the Quality of Service, QoS, contracts of each UE.

The MAC 310 iterates over the UEs until an SF is filled, and selects the lowest order modulation which will satisfy the QoS contracts of all UEs. The resulting output power and EVM for the SF is sent from the MAC 310 to the RE Control 320, and from there to the PA 325, which can suitably configure itself accordingly. The necessary output power and EVM requirement can also be expressed by the MAC 310 to the RE control 320 as a maximum output power setting composed of the following: average output power+modulation dependent PAPR margin.

In one version of the embodiment in which a quality indicator such as the QoS is used by the MAC 310 in order to carry out the scheduling, there can be a so called "coordinated link adaptation" based on the QoS target of the UE services. In such an embodiment, the MAC scheduler 310 calculates the smallest number of bits that needs to be transmitted to comply with the QoS contracts for each UE.

The "link adaptation" is first tried with the restriction that only robust modulations are used, for instance repeatedly using less and less robust modulations. The most robust modulation complying with the QoS contract is scheduled for use. When the QoS contract goals for a specific SF have been fulfilled, the highest order modulation used sets the restriction used by the other UEs during that SF. For instance, if the highest order modulation needed by an UE is 64QAM, this modulation will be available to be used for all the other UEs in the same SF.

The selected least robust modulation, in this example 64 QAM, and the output power for the PA 325, is signalled to the clipping function 323 and to the PA 325 in order for them to optimize for power efficiency during the next SF.

In order to decrease the amount of processing by the MAC scheduler 310, the MAC scheduler 310 suitably starts to compute the "link adaptation" for the UE which has the largest amount of bits which need to be transmitted in order to comply with the QoS contract of that UE, and then continues with the UE with the second largest amount of bits, etc.

In some RBSs, the time need to adapt to different output power levels of the PA may exceed 1 SF, i.e. 1 millisecond. The invention can be extended with a slow varying maximum output power limit in order to accommodate such radios, in a manner which will be described below.

In such embodiments, the MAC scheduler 310 predicts the maximum output power requirement (average+PAPR margin) for an upcoming time period, where the length of the time period of the prediction is at least as long as the time required for the RBS to adapt to different output power levels of the PA 325. The prediction is signalled to the RE Control 320 from the MAC scheduler 310 in order to adjust the biasing, i.e. the output power level of the PA 325.

Either the RE Control 320 signals back to the MAC scheduler 310 when the adjustment has been completed, or the MAC scheduler 310 uses a model of the RBS or of the PA 325 in order to determine by itself when a new maximum output power limit is valid. The MAC scheduler 310 then operates within this maximum output power, and optionally uses any of the scheduling possibilities outlined previously in this text.

If the MAC scheduler 310 predicts that the QoS contracts of the UEs in the cell cannot be met due to limits on the maximum output power of the PA 325, it sends a request to the RE Control 320 for an increase the maximum output power to the radio. (In this embodiment, the MAC scheduler 325 prediction can also be designed to use as little maximum output power as possible in order to support all desired traffic, or even to decrease the throughput of non-critical traffic to get an extra gain in output power saving.

Although the invention is applicable both in LTE systems and in WCDMA systems, in the "prediction embodiment", the prediction needs to also take into account the circuit switched (CS) traffic (such as DCH and CCH) carried over the same MCPA.

The prediction will thus include the CS traffic+the HSDPA power needs+possible margin. The MAC scheduler needs to investigate, for each TTI, the current maximum output power of the radio and the CS needs, and limit its own traffic correspondingly.

Figure 4:
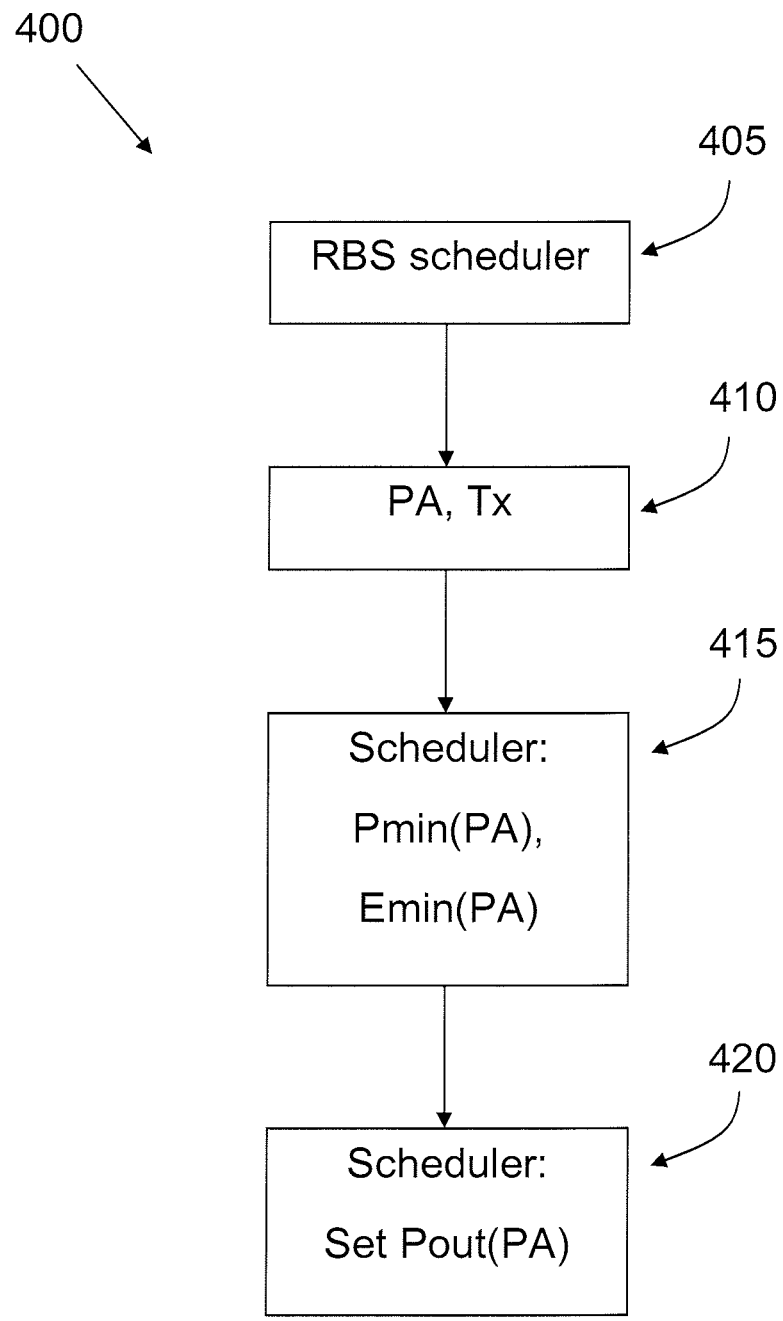
FIG. 4 shows a flow chart of a method of the invention.

FIG. 4 shows a flow chart of some of the major steps of a method 400 of the invention. The method 400 is intended for use in a base station of a cell in a cellular communications system, and as shown in step 405, the method 400 comprises using a scheduler in the base station for scheduling transmissions to users in the cell.

As indicated in step 410, the method 400 also comprises using a transmitter with a power amplifier for such transmissions, and as illustrated in step 415, the method also comprises letting the scheduler carry out its scheduling for an upcoming transmission period so as to minimize the output power level of the power amplifier and the level of a predefined error parameter in the power amplifier. Step 420 indicates that the method 400 also comprises letting the scheduler set the output power level of the power amplifier accordingly.

The invention is not limited to the examples of embodiments described above and shown in the drawings, but may be freely varied within the scope of the appended claims.

The invention claimed is:

1. A base station for a cell in a cellular communications system, the base station comprising a scheduler as well as a transmitter including a variable-power power amplifier and a control unit, wherein the scheduler is configured to:
schedule transmissions to users in the cell to occur during an upcoming transmission period to create a first set of sub-units of said upcoming transmission period which are free of payload traffic, and a second set of sub-units of said upcoming transmission period which contain payload traffic; and
determine an output power level of the power amplifier for the upcoming transmission period that minimizes the output power level, and correspondingly the level of a predefined error parameter in the power amplifier, for the first set of sub-units; and the control unit is configured to adjust a bias of the variable-power power amplifier to set the output power level of the power amplifier in response to the determination by the scheduler.

2. The base station of claim 1, wherein the predefined error parameter is the Error vector magnitude in the power amplifier.

3. The base station of claim 1, wherein the first set of sub-units is also free of reference symbols, and wherein the scheduler is configured to control the power amplifier to be turned off during the first set of sub-units.

4. The base station of claim 1, wherein the first set of sub-units contain reference symbols.

5. The base station of claim 4, wherein the scheduler is configured to identify the lowest order modulation with which the second set of sub-units can be transmitted, and to use this order modulation for the transmission of the second set of sub-units.

6. The base station of claim 5, wherein the lowest order modulation is identified by means of quality indicators assured to different recipients of the transmissions.

7. The base station of claim 4, wherein the scheduler is configured to identify users which need different orders of modulation and to group transmission to different users into different sub-units within the second set of sub-units, so that transmissions to users who need the same order of modulation are grouped into the same sub-units.

8. The base station of claim 1, wherein the scheduler is configured to predict the maximum output power level which should be used in transmissions during an upcoming interval in time and to use this level as a maximum when setting the output power level of the power amplifier.

9. The base station of claim 8, wherein the scheduler is configured to adjust the prediction upwards if a higher power level is necessary during said upcoming time interval.

10. The base station of claim 1, wherein the base station is an eNodeB in a Long Term Evolution (LTE) system, and wherein the upcoming transmission period is one or more LTE Sub Frames.

11. The base station of claim 1, wherein the base station is a NodeB in a WCDMA system, and wherein the upcoming transmission period is one or more WCDMA Frames.

12. A method implemented by a base station for a cell in a cellular communications system, the base station comprising a scheduler as well as a transmitter including a variable-cower power amplifier and a control unit, the method comprising:
scheduling transmissions to users in the cell to occur during an upcoming transmission period to create a first set of sub-units of said upcoming transmission period which are free of payload traffic, and a second set of sub-units of said upcoming transmission period which contain payload traffic; and
determining, by the scheduler, an output power level of the power amplifier for the upcoming transmission period that minimizes the output power level, and correspondingly the level of a predefined error parameter in the power amplifier, for the first set of sub-units; and
adjusting, by the control unit, a bias of the variable-power power amplifier to set the output power level of the power amplifier in response to the determination by the scheduler.

13. The method of claim 12, wherein the predefined error parameter is the Error vector magnitude in the power amplifier.

14. The method of claim 12, wherein said first set of sub-units is also free of reference symbols, and wherein said setting comprises turning the power amplifier off during the first set of sub-units.

15. The method of claim 12, wherein said first set of sub-units contain reference symbols.

16. The method of claim 15, further comprising identifying the lowest order modulation with which the second set of sub-units can be transmitted and using this order modulation for the transmission of the second set of sub-units.

17. The method of claim 16, wherein the lowest order modulation is identified by means of quality indicators assured to different recipients of the transmissions.

18. The method of claim 15, further comprising identifying users which need different orders of modulation and grouping transmissions to different users into different sub-units within the second set of sub-units, so that transmissions to users who need the same order of modulation are grouped into the same sub-units.

19. The method of claim 12, further comprising predicting the maximum output power level which should be used in transmissions during an upcoming interval in time and using this level as a maximum when setting the output power level of the power amplifier.

20. The method of claim 19, further comprising adjusting the prediction upwards if a higher power level is necessary during said upcoming time interval.

21. The method of claim 12, wherein the base station is an eNodeB in a Long Term Evolution (LTE) system, and wherein the upcoming transmission period is one or more LTE Sub Frames.

22. The method of claim 12, wherein the base station is a NodeB in a WCDMA system, and wherein the upcoming transmission period is one or more WCDMA Frames.

* * * * *

UNITED STATES PATENT AND TRADEMARK OFFICE
CERTIFICATE OF CORRECTION

PATENT NO. : 9,113,430 B2  
APPLICATION NO. : 13/254006  
DATED : August 18, 2015  
INVENTOR(S) : Österling et al.

Page 1 of 1

It is certified that error appears in the above-identified patent and that said Letters Patent is hereby corrected as shown below:

In the specification

In Column 6, Line 40, delete "(In this embodiment, the MAC scheduler 325" and insert -- In this embodiment, the MAC scheduler 310 --, therefor.

In the claims

In Column 8, Lines 10-11, in Claim 12, delete "variable-cower power amplifier" and insert -- variable-power power amplifier --, therefor.

Signed and Sealed this  
Twenty-second Day of March, 2016

Michelle K. Lee  
*Director of the United States Patent and Trademark Office*